United States Patent
Kweon et al.

(10) Patent No.: US 12,008,400 B2
(45) Date of Patent: Jun. 11, 2024

(54) METHOD AND DEVICE FOR ARRANGING SCHEDULE FOR COMPUTING TASK TO SERVER ON BASIS OF TASK DEPENDENCY

(71) Applicants: Samsung Electronics Co., Ltd., Suwon-si (KR); Korea University Research And Business Foundation, Seoul (KR)

(72) Inventors: Kisuk Kweon, Suwon-si (KR); Haneul Ko, Seoul (KR); Sangheon Pack, Seoul (KR); Jaewook Lee, Seoul (KR); Joonwoo Kim, Seoul (KR); Yujin Tae, Seoul (KR)

(73) Assignees: Samsung Electronics Co., Ltd., Suwon-si (KR); Korea University Research And Business Foundation, Seoul (KR)

( * ) Notice: Subject to any disclaimer, the term of this patent is extended or adjusted under 35 U.S.C. 154(b) by 501 days.

(21) Appl. No.: 17/309,183

(22) PCT Filed: Oct. 24, 2019

(86) PCT No.: PCT/KR2019/014040
§ 371 (c)(1),
(2) Date: May 4, 2021

(87) PCT Pub. No.: WO2020/096239
PCT Pub. Date: May 14, 2020

(65) Prior Publication Data
US 2021/0373947 A1 Dec. 2, 2021

(30) Foreign Application Priority Data
Nov. 6, 2018 (KR) .......... 10-2018-0135343

(51) Int. Cl.
G06F 9/48 (2006.01)
G06F 9/455 (2018.01)
G06F 9/50 (2006.01)

(52) U.S. Cl.
CPC ............ *G06F 9/4881* (2013.01); *G06F 9/455* (2013.01); *G06F 9/45558* (2013.01); *G06F 9/48* (2013.01);
(Continued)

(58) Field of Classification Search
CPC .......... G06F 9/455; G06F 9/45558; G06F 2009/4557; G06F 9/48; G06F 9/4806;
(Continued)

(56) References Cited

U.S. PATENT DOCUMENTS

| 9,542,231 B2 * | 1/2017 | Khan .................. G06F 8/451 |
| 2010/0017804 A1 * | 1/2010 | Gupta .................. G06F 9/5033 718/102 |

(Continued)

FOREIGN PATENT DOCUMENTS

| JP | 2011-243120 A | 12/2011 |
| JP | 2016-162067 A | 9/2016 |

(Continued)

OTHER PUBLICATIONS

Satish et al, "Scheduling Task Dependence Graphs with Variable Task Execution Times onto Heterogeneous Multiprocessors", EMSOFT'08, 2008, ACM, pp. 149-158. (Year: 2008).*

(Continued)

*Primary Examiner* — Charles M Swift

(57) ABSTRACT

The disclosure relates to a method and a control server for scheduling a computing task including a plurality of tasks to be performed by computation servers. The control server according to some embodiments includes: a transceiver; a memory; and at least one processor configured to receive the (Continued)

computing task from a terminal, generate a task dependency graph based on a dependency relationship of each of the plurality of tasks included in the computing task, obtain computation processing capacity information of each of the plurality of computation servers and information of transmission latency between the plurality of computation servers, schedule the plurality of tasks to be performed by at least two computation severs of the plurality of computation servers, based on the task dependency graph, the computation processing capacity information, and the information of transmission latency, and transmit, to the terminal, an execution result of the plurality of tasks received from at least one of the plurality of computation servers.

11 Claims, 11 Drawing Sheets

(52) U.S. Cl.
CPC .......... *G06F 9/4806* (2013.01); *G06F 9/4843* (2013.01); *G06F 9/50* (2013.01); *G06F 9/5005* (2013.01); *G06F 9/5027* (2013.01); *G06F 9/5038* (2013.01); *G06F 9/505* (2013.01); *G06F 9/5066* (2013.01); *G06F 2009/4557* (2013.01); *G06F 2209/501* (2013.01)

(58) Field of Classification Search
CPC ........ G06F 9/4843; G06F 9/4881; G06F 9/50; G06F 9/5005; G06F 9/5027; G06F 9/5038; G06F 9/505; G06F 9/5066; G06F 2209/501
See application file for complete search history.

(56) References Cited

U.S. PATENT DOCUMENTS

| 2010/0174579 | A1* | 7/2010 | Hughes | G06Q 10/067 705/348 |
|---|---|---|---|---|
| 2013/0198755 | A1* | 8/2013 | Kim | G06F 9/505 718/104 |
| 2014/0108861 | A1 | 4/2014 | Abadi et al. | |
| 2015/0026306 | A1 | 1/2015 | Moon et al. | |
| 2015/0200867 | A1* | 7/2015 | Dutta | H04L 41/0896 709/226 |
| 2016/0098292 | A1* | 4/2016 | Boutin | G06F 9/4881 718/104 |
| 2016/0364265 | A1* | 12/2016 | Cao | G06F 9/4881 |
| 2019/0146837 | A1 | 5/2019 | Ki | |

FOREIGN PATENT DOCUMENTS

| KR | 10-2009-0065133 | A | 6/2009 |
|---|---|---|---|
| KR | 10-1465879 | B1 | 11/2014 |
| KR | 10-2015-0009662 | A | 1/2015 |
| KR | 10-2016-0037737 | A | 4/2016 |
| KR | 10-1656706 | B1 | 9/2016 |
| KR | 10-2017-0044320 | A | 4/2017 |
| KR | 10-1844914 | B1 | 4/2018 |

OTHER PUBLICATIONS

International Search Report and Written Opinion of the International Searching Authority in connection with International Application No. PCT/KR2019/014040, dated Jan. 30, 2020, 10 pages.
Translation of Written Opinion of the International Searching Authority dated Jan. 30, 2020 in connection with International Application No. PCT/KR2019/014040, 4 pages.
Decision of Rejection dated Jan. 30, 2023 in connection with Korean Patent Application No. 10-2018-0135343, 13 pages.
Notice of Allowance dated Aug. 2, 2023, in connection with Korean Patent Application No. 10-2018-0135343, 5 pages.

* cited by examiner

METHOD AND DEVICE FOR ARRANGING SCHEDULE FOR COMPUTING TASK TO SERVER ON BASIS OF TASK DEPENDENCY

CROSS-REFERENCE TO RELATED APPLICATIONS

This application is a 371 of International Application No. PCT/KR2019/014040, filed Oct. 24, 2019, which claims priority to Korean Patent Application No. 10-2018-0135343, filed Nov. 6, 2018, the disclosures of which are herein incorporated by reference in their entirety.

BACKGROUND

1. Field

Various embodiments of the present disclosure relate to a wireless communication system, and more particularly, to a device for scheduling a computing task including a plurality of tasks to be performed by computation servers and an operating method of the device.

2. Description of Related Art

In order to meet the increasing demand with respect to wireless data traffic after the commercialization of $4^{th}$ generation (4G) communication systems, efforts have been made to develop enhanced $5^{th}$ generation (5G) communication systems or pre-5G communication systems. For this reason, 5G communication systems or pre-5G communication systems are called 'beyond 4G network communication systems' or 'post long term evolution (LTE) systems'. In order to achieve a high data rate, consideration is given to implementing 5G communication systems in ultra-high frequency bands (mmW) (e.g., 60 GHz bands). In order to reduce propagation path loss of radio waves and increase a propagation distance of radio waves in ultra-high frequency bands, for 5G communication systems, discussions are underway about technologies such as beamforming, massive multiple-input multiple-output (MIMO), full dimensional MIMO (FD-MIMO), array antenna, analog beamforming, and large scale antenna. Also, in order to improve networks of systems, for 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway. Furthermore, for 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter-bank multi-carrier (FBMC), non-orthogonal multiple access (NOMA), or sparse code multiple access (SCMA) is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technologies such as sensor network, M2M communication, and MTC are implemented by 5G communication technologies such as beamforming, MIMO, and array antenna. The application of a cloud RAN as big data processing technology may also be considered as an example of convergence between 5G technology and IoT technology.

As various services may be provided with the development of mobile communication systems, there is a demand for methods of smoothly providing such services.

In order to provide ultra-low latency services, the $3^{rd}$ generation partnership project (3GPP) is working on standardization for reducing a communication latency through a method of, for example, defining a transmission time interval (TTI) to be less than 1 ms by changing a radio frame structure, adjusting a hybrid automatic repeat request (HARQ) scheme, and improving an initial access procedure and scheduling. Mobile edge computing (MEC) or multi-access edge computing technology conducted by the European Telecommunications Standards Institute (ETSI) is expected to be an effective technology for providing ultra-low latency services.

SUMMARY

Various embodiments of the present disclosure may provide a method and device for transmitting and receiving a signal in a wireless communication system, to reduce a time for performing a computing task by scheduling the computing task including a plurality of tasks to be performed by computation servers based on a dependency relationship of each of the tasks included in the computing task, computation processing capacity information of each of a computation servers, and transmission latency information between the computation servers.

DETAILED DESCRIPTION

Figure 1:
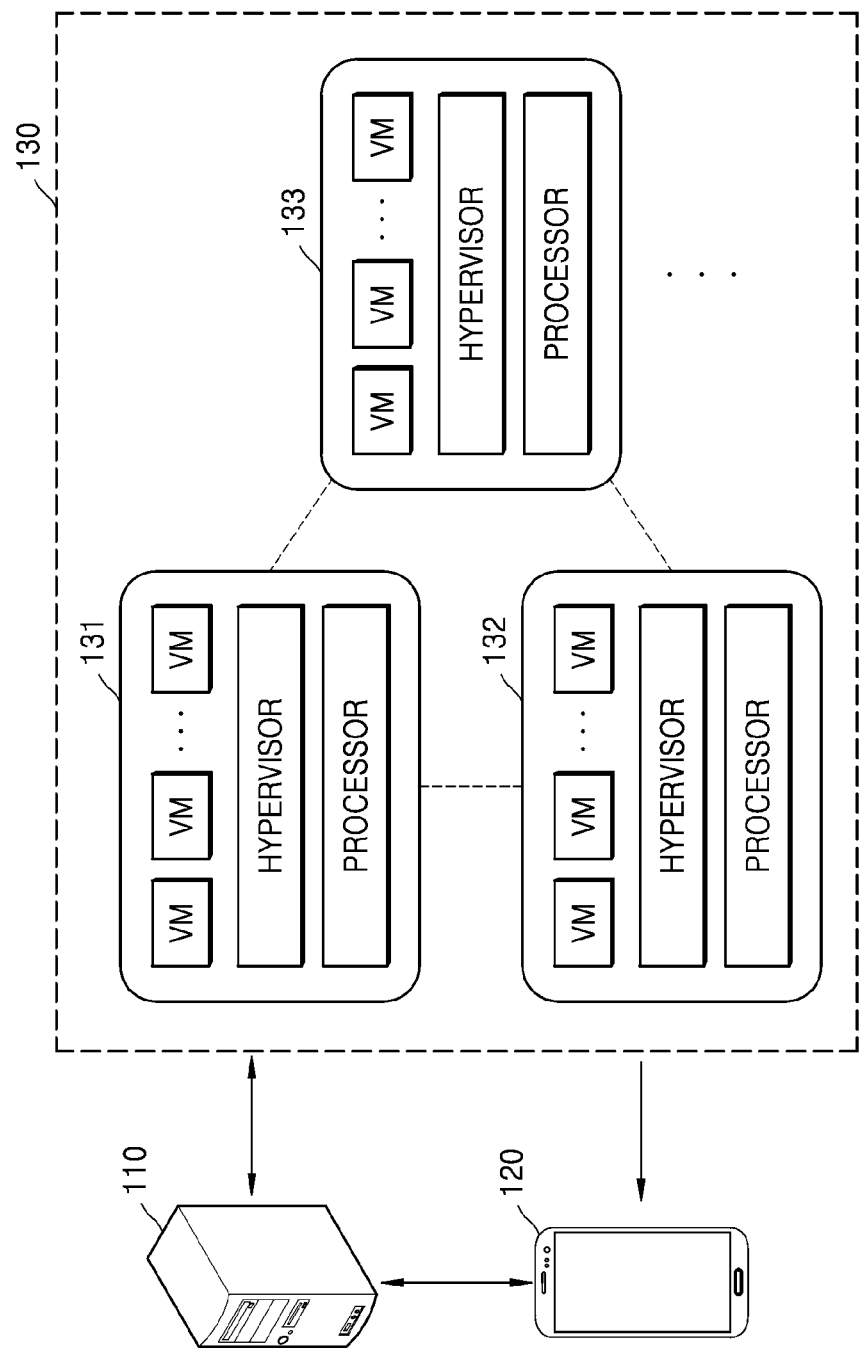
FIG. 1 is a conceptual diagram for describing operations of a control server and a terminal, according to some embodiments.

A control server for scheduling a computing task including a plurality of tasks to be performed by computation servers according to some embodiments includes: a transceiver; a memory; and at least one processor configured to execute instructions to receive the computing task from a terminal, generate a task dependency graph based on a dependency relationship of each of the plurality of tasks included in the computing task, obtain computation processing capacity information of each of a plurality of computation servers and information of transmission latency between the plurality of computation servers, schedule the plurality of tasks to be performed by at least two computation servers of the plurality of computation servers, based on the task dependency graph, the computation processing capacity information, and the information of transmission latency, and transmit, to the terminal, an execution result of the plurality of tasks received from at least one of the plurality of computation servers.

The at least one processor according to some embodiments may be further configured to receive the computing task from a terminal, generate a task dependency graph based on a dependency relationship of each of the plurality of tasks included in the computing task, obtain computation processing capacity information of each of a plurality of computation servers and information of transmission latency between the plurality of computation servers, schedule the plurality of tasks to be performed by at least two computation servers of the plurality of computation servers, based on the task dependency graph, the computation processing capacity information, and the information of transmission latency, and transmit an execution result of the plurality of tasks received from at least one of the plurality of computation servers to the terminal.

The at least one processor according to some embodiments may be further configured to identify a computational complexity of each of the plurality of tasks, adjust the computational complexity of each of the plurality of tasks, by converting at least one of the plurality of tasks into at least one sub-task, and generate the task dependency graph based on a dependency relationship of each of the plurality of tasks whose computational complexities are adjusted.

The at least one processor according to some embodiments may be further configured to, in case that a second task of the plurality of tasks has a dependency relationship with a first task, allocate the second task to a first computation server to which the first task is allocated, and in case that the second task is un-allocatable to the first computation server, allocate the second task to a second computation server having a shortest transmission latency from the first computation server from among computation servers to which the second task is allocatable based on the information of transmission latency.

The at least one processor according to some embodiments may be further configured to, in case that a second task of the plurality of tasks has a dependency relationship with a first task, allocate the second task to a first computation server to which the first task is allocated, in case that the second task is un-allocatable to the first computation server, allocate the second task to a second computation server having a shortest transmission latency from the first computation server based on the transmission latency information, and in case that the second task is un-allocatable to the second computation server, allocate the second task to a third computation server having a largest computation processing capacity from among the plurality of computation servers based on the computation processing capacity information.

According to some embodiments, each of the plurality of computation servers may include a plurality of virtual machines (VMs), wherein the at least one processor is further configured to schedule the plurality of tasks to be performed by the at least two computation servers of the plurality of computation servers by allocating the plurality of tasks to the at least two computation servers and determining a time at which each of the plurality of tasks is to be performed, and for a first task and a second task allocated to a first VM of a first computation server, in case that a time at which the first task is to be performed and a time at which the second task is performed at least partially overlap each other, allocate the second task to a second VM of the first computation server and determine a time at which the second task is to be performed, or determine a time at which the second task is to be performed so that the second task is performed after the first task is performed.

The at least one processor according to some embodiments may be further configured to schedule the plurality of tasks to be performed by the at least two computation servers of the plurality of computation servers by allocating the plurality of tasks to the at least two computation servers and determining a time at which each of the plurality of tasks is to be performed, identify a computational complexity of each of the plurality of tasks, adjust the computational complexity of each of the plurality of tasks by converting at least one of the plurality of tasks into at least one sub-task, generate a spread task dependency graph according to a dependency relationship of each of the plurality of tasks whose computational complexities are adjusted, allocate the plurality of tasks to the at least two computation servers based on the spread task dependency graph, and determine a time at which each of the plurality of tasks is to be performed based on the task dependency graph generated based on the dependency relationship of each of the plurality of tasks whose computational complexities are not adjusted.

A method, performed by a control server, of scheduling a computing task including a plurality of tasks to be performed by computation servers according to some embodiments includes: receiving the computing task from a terminal; generating a task dependency graph based on a dependency relationship of each of the plurality of tasks included in the computing task; obtaining computing processing capacity information of each of a plurality of computation servers and information of transmission latency between the plurality of computation servers; scheduling the plurality of tasks to be performed by at least two computation servers of the plurality of computation servers, based on the task dependency graph, the computation processing capacity information, and the information of transmission latency; and transmitting an execution result of the plurality of tasks received from at least one of the plurality of computation servers to the terminal.

A terminal for offloading a computing task including a plurality of tasks to a control server according to some embodiments includes: a transceiver; a memory; and at least one processor configured to: transmit the computing task to the control server, and receive an execution result of the plurality of tasks from the control server or at least one computation server. The execution result is a result of performing the plurality of tasks from at least two computation servers of a plurality of computation servers scheduled based on a task dependency graph generated based on a dependency relationship of each of the plurality of tasks, computation processing capacity information of each of the plurality of computation servers, and information of transmission latency between the plurality of computation servers.

MODE OF DISCLOSURE

As future communication systems after long term evolution (LTE), 5th generation (5G) communication systems should be able to freely reflect requirements of users and service providers, and thus services satisfying the various requirements should be supported. Services considered for 5G communication systems include enhanced mobile broadband (eMBB), massive machine type communication (mMTC), and ultra-reliable low-latency communication (URLLC).

Technology in which a terminal receives broadcast information from a base station in a wireless communication system will now be described. The present disclosure relates to a communication method of converging a 5G communication system for supporting a higher data rate than a 4$^{th}$ generation (4G) system or a post 4G system with Internet of things (IoT) technology, and a system of the communication method. The present disclosure may be applied to intelligent services based on 5G communication technology and IoT-related technology (e.g., smart home, smart building, smart city, smart car or connected car, health care, digital education, retail, security, and safety-related services).

Hereinafter, embodiments of the present disclosure will be described in detail with reference to the accompanying drawings.

In the following description of embodiments, descriptions of techniques that are well known in the art and not directly related to the present disclosure are omitted. This is to clearly convey the gist of the present disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

In this case, it will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing device, the instructions, which are executed via the processor of the computer or other programmable data processing device generate means for implementing functions specified in the flowchart block(s). Because these computer program instructions may also be stored in a computer usable or computer-readable memory that may direct a computer or other programmable data processing device to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing device, a series of operational steps may be performed on the computer or other programmable device to produce a computer implemented process, and thus the instructions executed on the computer or other programmable device may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

In this case, the term "~unit" used in the present embodiment refers to a software or hardware component, such as a field-programmable gate array (FPGA) or an application-specific integrated circuit (ASIC), which performs certain tasks. However, "~unit" does not mean to be limited to software or hardware. The term "~unit" may be configured to be in an addressable storage medium or configured to operate one or more processors. Thus, "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~units" may be combined into fewer components and "~units" or may be further separated into additional components and "~units". Further, components and "~units" may be implemented to operate one or more central processing units (CPUs) in a device or a secure multimedia card. Also, a "~unit" in an embodiment may include one or more processors.

FIG. 1 is a conceptual diagram for describing operations of a control server 110 and a terminal 120, according to some embodiments.

Mobile edge computing (MEC) or multi-access edge computing technology conducted by the European telecommunications standards institute (ETSI) is a technology for providing ultra-low latency services.

MEC has been developed to enable an IT service environment and cloud computing capabilities at an edge of a mobile network, inside a radio access network (RAN), and near mobile subscribers. MEC aims to reduce a latency, ensure highly efficient network operation and service provision, and provide improved user experience. Access to MEC may include another type of access other than cellular such as fixed networks and Wi-Fi.

In order for MEC to satisfy requirements for ultra-low latency services in a real network, some issues such as mobility support and resource management have to be resolved. In particular, in order to compensate for the insufficient performance of mobile devices, many methods of offloading a computation to be performed by a mobile device to an edge cloud of MEC have recently been studied. However, because the edge cloud of MEC generally has limited computing resources, and future ultra-low latency services (e.g., augmented reality (AR), virtual reality (VR), and holography) require complex computations, there is a demand for a method of ensuring a short processing time and providing an offloading service by using an edge cloud.

Various embodiments of the disclosure provide a method and device by which a control server receives an offloading service request from a terminal and performs parallel processing for a computing task on a plurality of computation servers in a distributed manner.

Referring to FIG. 1, the terminal 120 may transmit an offloading request to the control server 110 for a computing task that is difficult for the terminal 120. In response to receiving the offloading request and a computing task including a plurality of tasks from the terminal 120, the control server 110 may schedule and transmit a task to a plurality of computation servers 130. The plurality of computation servers 130 may perform the task according to scheduling and may transmit an execution result to the control server 110 or the terminal 120.

The control server 110 may be any of various servers that perform scheduling. For example, the control server 110 may be a base station (e.g., an eNB or a gNB), or may be a data center that performs scheduling. However, the disclosure is not limited thereto, and the control server may include various servers.

Each of the plurality of computation servers 130 may be any of various servers that perform a computation or a task. For example, each of the plurality of computation servers 130 may be a base station (e.g., an eNB or a gNB), an access point (AP), or a data center. Also, each of the plurality of computation servers 130 may be an edge cloud device installed near the terminal 120. However, the disclosure is not limited thereto, and the computation server may include any of various servers.

Each of the plurality of computation servers 130 may drive at least one virtual machine (VM), and may include at least one processor and a hypervisor for driving the VM. Each computation server may transmit/receive a signal by wire or wirelessly to/from another computation server. For example, a first computation server 131, a second computation server 132, and a third computation server 133 may transmit/receive a task or a task execution result by wire or wirelessly. The number of computation servers included in the plurality of computation servers 130 is not limited to that illustrated in FIG. 1, and may be modified in various ways.

The control server 110 may configure the plurality of computation servers 130 located near the terminal 120 as an edge cluster based on a location of the terminal 120. The terminal 120 may receive an execution result of a task performed by the edge cluster located near the terminal 120, by transmitting an offloading request of the computing task to the control server 110.

Figure 2:
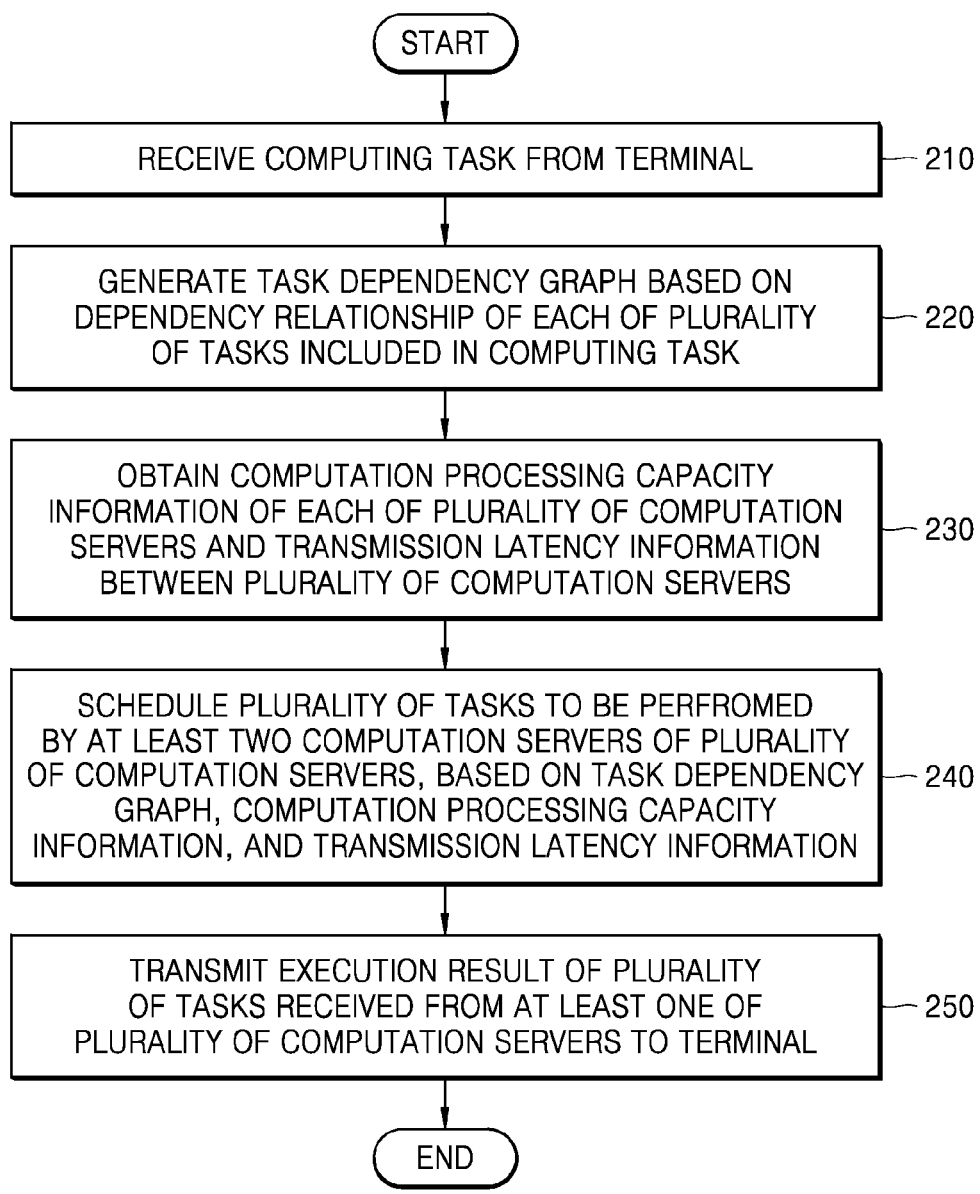
FIG. 2 is a flowchart for describing a method by which a control server schedules a computing task to be performed by computation servers, according to some embodiments.

FIG. 2 is a flowchart for describing a method by which a control server schedules a computing task to be performed by computation servers, according to some embodiments.

In operation 210, a control server may receive a computing task from a terminal.

The terminal may transmit the computing task including a plurality of tasks to the control server. The terminal may transmit an offloading request for the computing task along with the computing task to the control server.

A type of the computing task may be determined in various ways. For example, the computing task may be a computation set for performing a service provided by an application installed in the terminal. However, the disclosure is not limited thereto, and the computing task may include any of various types of tasks.

In operation 220, the control server may generate a task dependency graph based on a dependency relationship of each of the plurality of tasks included in the computing task.

The task dependency graph is a graph showing a dependency relationship of the plurality of tasks. For example, when a first task has to be first performed in order to perform a second task, the second task may be defined as having a dependency relationship with the first task. Alternatively, the second task may be defined as being dependent on the first task.

For example, the control server may determine a dependency relationship between the plurality of tasks included in the computing task by analyzing the computing task received from the terminal, and may generate the task dependency graph based on the determined dependency relationship.

The control server according to some embodiments may generate a spread task dependency graph in which a computational complexity of each of the plurality of tasks is adjusted. The control server may allocate the plurality of tasks to at least two computation servers of a plurality of computation servers based on the spread task dependency graph.

In operation 230, the control server may obtain computation processing capacity information of each of the plurality of servers and transmission latency information between the plurality of computation servers.

The computation processing capacity information may refer to information on the capability of a computation server to perform a task or information on how many resources a computation server currently has so as to process a task. For example, the computation processing capacity information may include at least one of the number of computations which a computation server may process within a certain time, scheduling information in which a time-based task is allocated to a computation server, and information on a time interval during which a task may be allocated to a computation server. For example, a time interval during which a task may be allocated may be a time interval during which a task of a computation server may be performed because a task is not yet allocated to the computation server.

The transmission latency information between the computation servers may refer to a time taken to transmit a signal from a first computation server to a second computation server that is different from the first computation server. For example, the transmission latency information may refer to a time taken to transmit a task execution result of a first computation server to a second computation server.

The plurality of computation servers may be physically spaced apart from one another.aaa When the plurality of computation servers are physically spaced apart from one another, a transmission latency may occur in transmitting/receiving a signal by wire or wirelessly between the computation servers. Also, at least some of the plurality of computation servers may be installed in one device. A transmission latency may occur even when a signal is transmitted/received between the at least some computation servers installed in the one device.

According to some embodiments, each of at least some of the plurality of computation servers may drive a plurality of virtual machines (VMs). For example, one VM may perform one task during one time interval. A computation server that drives a plurality of VMs may perform a plurality of tasks during one time interval by performing a task by driving each VM.

According to some embodiments, the computation processing capacity information of each computation server may include the number of VMs driven by the computation server. Also, the computation processing capacity information may refer to information on the capability of each VM included in a computation server to perform a task or information on how many resources each VM currently has so as to process a task. For example, the computation processing capacity information may include at least one of the number of computations which each VM may process within a certain time, scheduling information in which a time-based task is allocated to each VM, and information on a time interval during which a task may be allocated to each VM.

According to some embodiments, the control server may receive the computation processing capacity information of each of the plurality of computation servers and the transmission latency information between the plurality of computation servers from the plurality of computation servers. For example, the control server may periodically receive the computation processing capacity information and the transmission latency information from the plurality of computation servers. Also, the control server may store the computation processing capacity information and the transmission latency information received from the plurality of computation servers, and may obtain the computation processing capacity information and the transmission latency information by loading the stored information. Also, in response to receiving renewed computation processing capacity information or renewed transmission latency information from the plurality of computation servers, the control server may renew (i.e., update) the computation processing capacity information and the transmission latency information stored in the control server. However, the method is merely an example, and a method by which the control server obtains the computation processing capacity information of each of the plurality of computation servers and the transmission latency information between the plurality of computation servers is not limited to the above method.

In operation 240, the control server may schedule the plurality of tasks to be performed by at least two computation servers of the plurality of computation servers, based on the task dependency graph, the computation processing capacity information, and the transmission latency information.

An operation by which the control server schedules the plurality of tasks may include an operation of allocating each task to a computation server and an operation of determining a time at which each task is performed.

The control server according to some embodiments may schedule the plurality of tasks to the plurality of computation servers for each step of the task dependency graph. The control server may schedule at least one task included in one step to at least one computation server.

The control server may allocate each task according to a dependency relationship, based on the task dependency graph or the spread task dependency graph. A method by which the control server allocates a task according to a dependency relationship for each step of the task dependency graph will be described in detail with reference to FIG. 5.

According to some embodiments, the control server may determine a time at which each task is performed in the allocating of the plurality of tasks to the plurality of computation servers. For example, the control server may determine a time at which each task is performed based on a time required for each task and the transmission latency information, or may determine a time at which each task is performed based on each step of the spread task dependency graph.

The control server according to some embodiments may determine a time at which each task is performed after the plurality of tasks are allocated to the plurality of computation servers. An operation by which the control server determines a time at which each task is performed will be described in detail with reference to FIG. 7.

In operation 250, the control server may transmit an execution result of the plurality of tasks received from at least one of the plurality of computation servers to the terminal.

Each of a first step and a last step of the task dependency graph may include one task. That is, the plurality of tasks included in the computing task received from the terminal may converge to one task in the last step of the task dependency graph.

The task of the last step may be allocated to one computation server. Alternatively, when a computational throughput of the task of the last step is large, the task of the last step may be allocated to a plurality of computation servers.

After at least one computation server to which the task of the last step is allocated performs the task, a task execution result may be transmitted to the control server, or may be directly transmitted to the terminal. The control server may transmit the task execution result received from the at least one computation server to the terminal.

An order in which operations of FIG. 2 are performed is not limited to that illustrated in FIG. 2, and may be determined in various ways. For example, operation 230 may be performed before operation 210, or may be performed before operation 220.

Because the control server according to various embodiments of the disclosure performs process a plurality of tasks in parallel in a distributed manner in consideration of a dependency of each task, a computation processing capacity of each of computation servers, and a transmission latency between the computation servers, a low scheduling complexity may be ensured and a time taken to complete a computing task may be reduced. That is, the control server may provide an ultra-low latency service that requires a large amount of computation along with a low processing time. For example, the control server may reduce a time taken to complete a computing task, when compared to a dependency unaware method that does not consider a task dependency or a capacity-based method that considers only a computation processing capacity of a computation server.

Also, when a plurality of computation servers are edge servers located near a terminal, because a transmission latency required for a control server to transmit a scheduled task to the plurality of computation servers, and a transmission latency required for the computation servers to transmit a task execution result to the control server or the terminal may be reduced, a time taken to complete a computing task may be further reduced.

Figure 3:
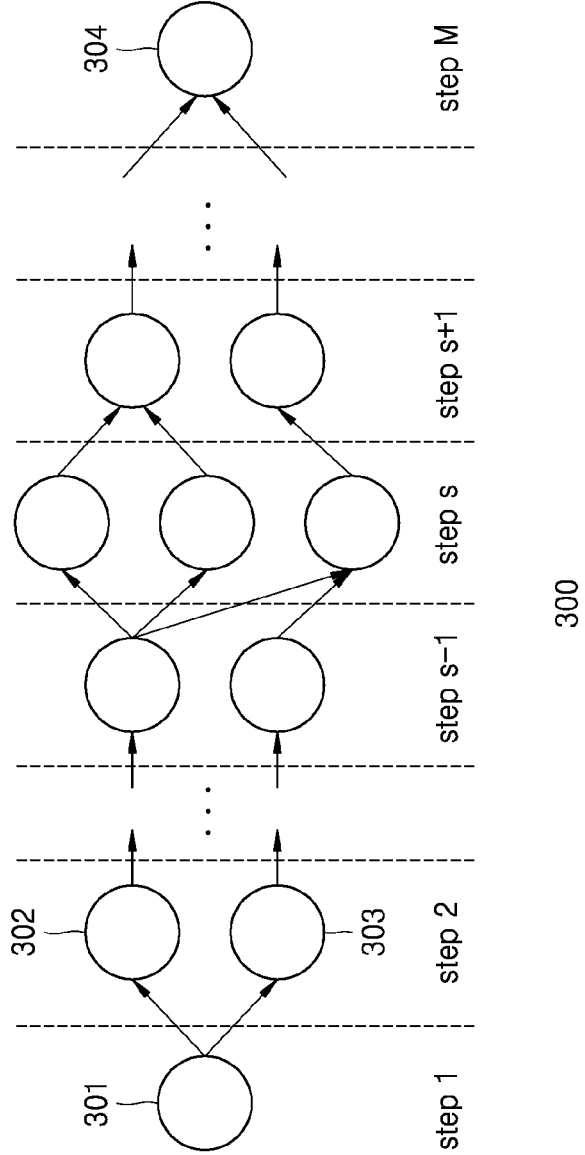
FIG. 3 is a diagram for describing a task dependency graph according to some embodiments.

FIG. 3 is a diagram for describing a task dependency graph 300 according to some embodiments.

Referring to FIG. 3, the task dependency graph 300 generated by a control server according to some embodiments may include a plurality of steps. Each step may include at least one task. That is, the control server may generate the task dependency graph 300 by adjusting a computing task received from a terminal to a plurality of steps and locating at least one task in each step.

A circle in the task dependency graph 300 indicates one task unit. A task unit may be a logical or conceptual division of a plurality of tasks in order for the control server to easily schedule tasks. Alternatively, one task unit may refer to one task.

An arrow in the task dependency graph 300 indicates a dependency. For example, each of a task 302 and a task 303 has a dependency with a task 301. A dependency relationship may be determined to be, for example, but not limited to, 1:1, 1:n, or m:n. Various dependency relationships of each task are illustrated in steps s-1 and s in the task dependency graph 300.

An entire computing task may start from one task, develop into a plurality of tasks, and then converge back to one task in the task dependency graph 300. In FIG. 3, in the task dependency graph 300, a task of a step 1 that is a first step is the task 301, and a task of a step M that is a last step is a task 304.

A computational complexity of each task in the task dependency graph 300 may be any of various complexities. The control server may generate a spread task dependency graph by adjusting a computational complexity of each task.

Figure 4:
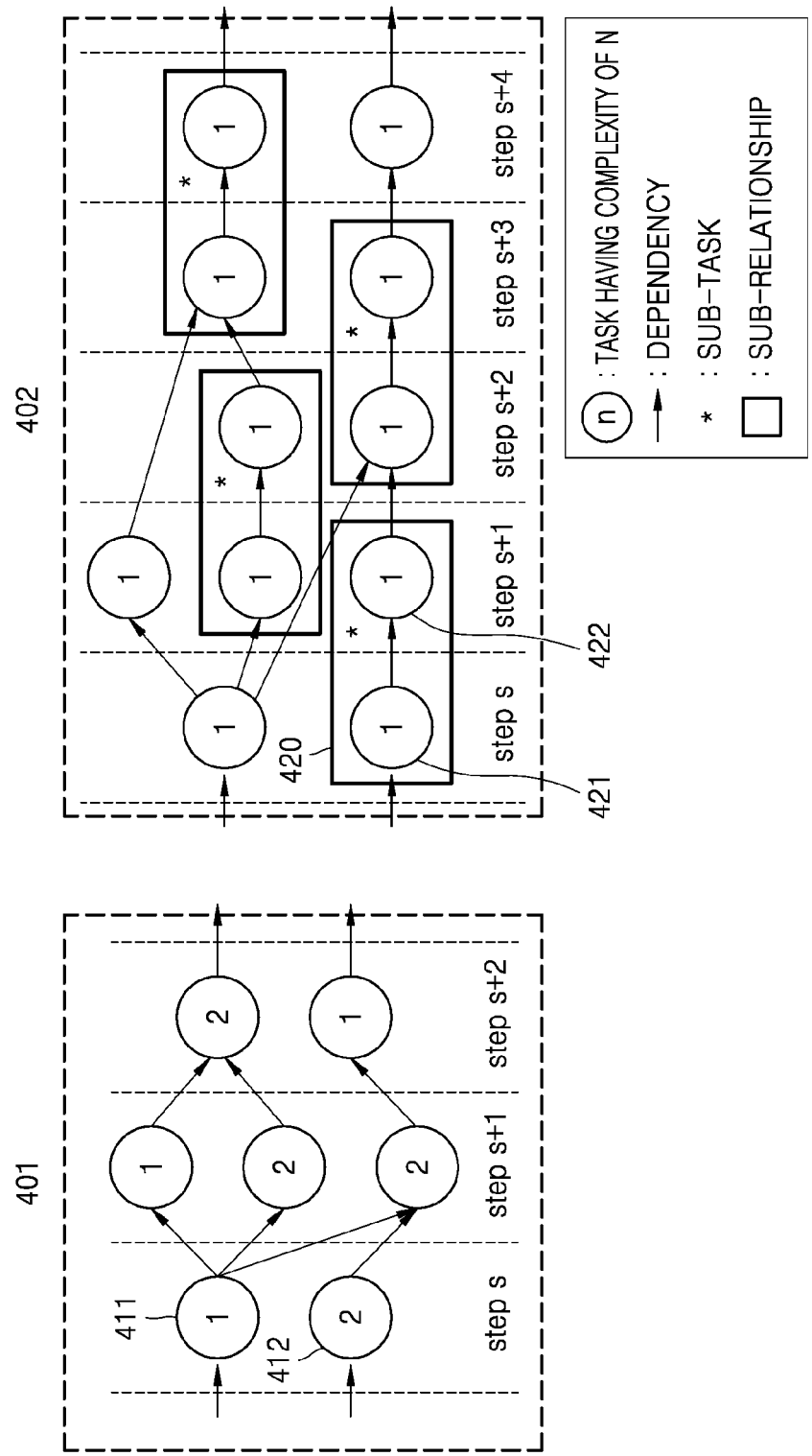
FIG. 4 is a diagram for describing a method by which a control server generates a spread task dependency graph by adjusting computational complexities of tasks, according to some embodiments.

FIG. 4 is a diagram for describing a method by which a control server generates a spread task dependency graph by adjusting computational complexities of tasks, according to some embodiments.

401 of FIG. 4 illustrates only steps s, s+1, and s+2 of the task dependency graph 300 of FIG. 3. Referring to 401 of FIG. 4, each task included in the task dependency graph may have a different computational complexity. For example, a task 411 may have a computational complexity of 1, and a task 422 may have a computational complexity of 2.

The term 'computational complexity' may refer to the amount of computation required to perform each task. When the amount of computation increases, a time required for each task may increase. When a plurality of tasks are allocated to a computation server for each step of the task dependency graph and computational complexities of the tasks included in each step are different from one another, it may take a long time to complete an entire computing task. For example, a computation server or a VM that performs the task 411 having a computational complexity of 1 in the step s of 401 of FIG. 4 may wait until the task 412 having a computational complexity of 2 is performed, and then may proceed to a task of the step s+1, thereby requiring a waiting time.

A control server according to some embodiments may reduce a time taken to complete an entire computing task when a plurality of tasks are allocated to a computation server for each step of the task dependency graph, by generating a spread task dependency graph 402 by adjusting a computational complexity of at least one task.

When a computational complexity of a task is adjusted, it may mean that a computational complexity of each task is adjusted to an equal or similar complexity. For example, the control server may set a reference computational complexity to 1, and may adjust a computational complexity so that any of tasks has a computational complexity between 0.8 and 1.2. However, the disclosure is not limited thereto, and the control server may adjust a computational complexity so that any of tasks has a computational complexity within a certain range.

The control server according to some embodiments may adjust computational complexities of a plurality of tasks by converting a task having a high computational complexity into at least one sub-task. For example, referring to FIG. 4, the control server may generate the spread task dependency graph 402 by converting the task 412 having a computational complexity of 2 into a sub-task 421 and a sub-task each having a computational complexity of 1.

Tasks converted into sub-tasks have a sub-relationship with each other. A sub-relationship and sub-tasks are shown in the spread task dependency graph 402. Tasks having a sub-relationship are only logically or conceptually separated in order to adjust a computational complexity of the task dependency graph. However, tasks having a sub-relationship are one task before being separated, and thus the tasks having a sub-relationship are performed in the same computation server or the same VM.

Figure 5:
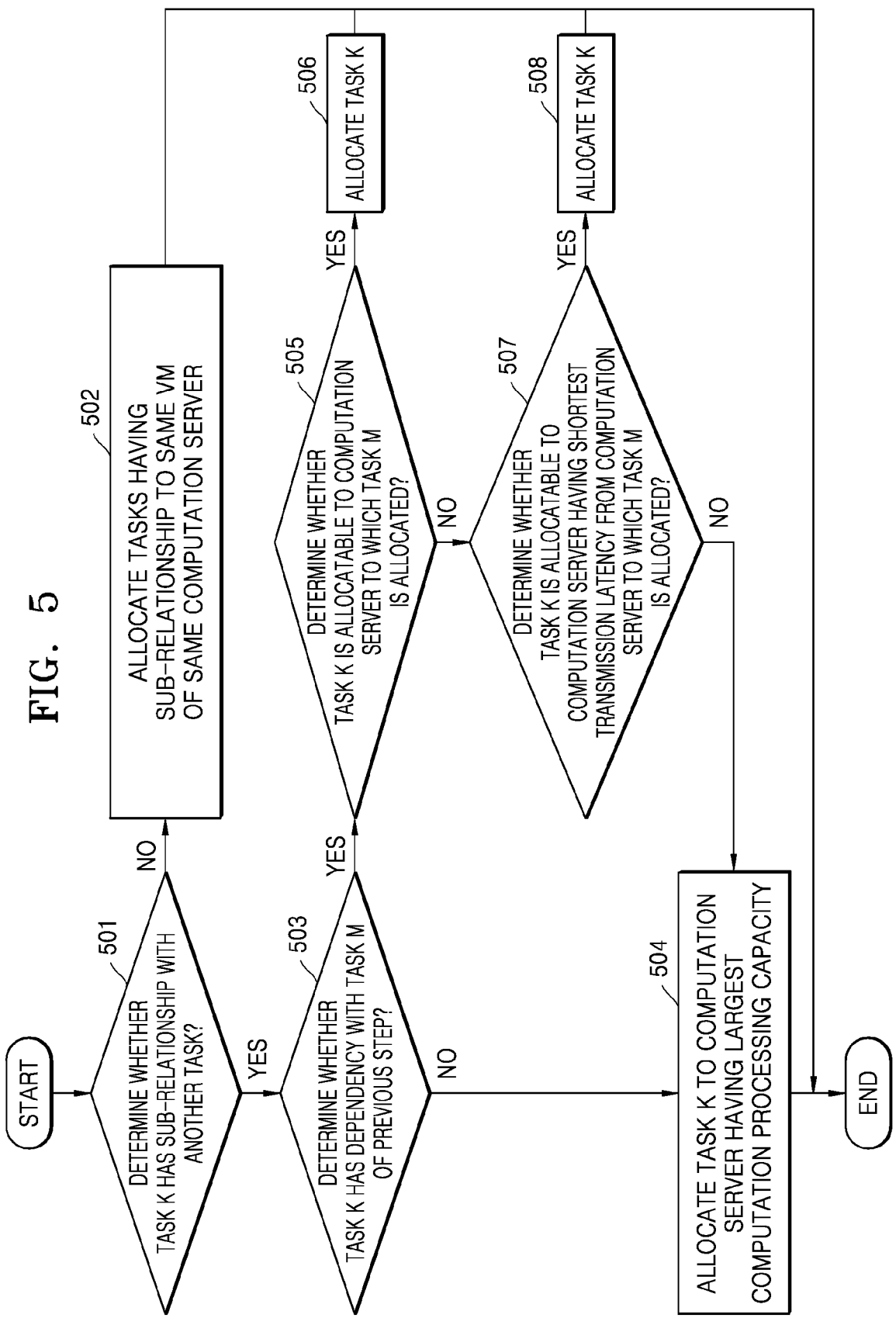
FIG. 5 is a flowchart for describing a method by which a control server schedules a computing task to be performed by computation servers, according to some embodiments.

FIG. 5 is a flowchart for describing a method by which a control server schedules a computing task to be performed by computation servers, according to some embodiments.

The control server according to some embodiments may schedule each task included in each step to at least one computation server, for each step of a spread task dependency graph. FIG. 5 is a diagram for describing a method of scheduling a task k of a step s of a spread task dependency graph to a computation server.

In operation 501, a control server may determine whether the task k has a sub-relationship with another task. For example, the control server may determine whether there is a task n having a sub-relationship with the task k in at least one step before the step s.

In operation 502, the control server may allocate tasks having a sub-relationship to the same VM of the same computation server. For example, the control server may allocate the task k to a VM of a computation server to which the task n having a sub-relationship with the task k is allocated.

Tasks having a sub-relationship are separated in a spread task dependency graph in order to adjust a computational complexity of a task dependency graph, and may not be performed in different VMs due to characteristics of the sub-relationship. Accordingly, the tasks having the sub-relationship are allocated to the same VM of the same computation server.

In operation 503, the control server may determine whether the task k has a dependency with a task m of a previous step. For example, the control server may determine whether there is the task m having a dependency with the task k in at least one step before the step s.

Also, the control server may select one task m from among a plurality of tasks having a dependency with the task k.

According to the spread task dependency graph, a task having no dependency with a task of a previous step is only a first task of a first step. The remaining tasks other than the first task have a dependency with at least one task.

In operation 504, when the task k has no dependency with the task m of the previous step, the control server may allocate the task k to a computation server having a largest computation processing capacity. That is, when the task k is a first task of a first step, the control server allocates the task k to the computation server having the largest computation processing capacity.

For example, the computation server having the largest computation processing capacity may be a computation server that drives a largest number of VMs or a server having a largest number of computations that may be processed within a certain time from among a plurality of computation servers.

The control server may increase the probability that tasks having a dependency with one another in next steps are allocated to one computation server, by allocating the first task of the first step to the computation server having the largest computation processing capacity. When tasks having a dependency with one another are allocated to one computation server, the tasks having the dependency with one another may be performed without a transmission latency between computation servers, thereby reducing a time taken to complete a computing task.

In operation 505, the control server may determine whether the task k is allocatable to a computation server to which the task m is allocated.

For example, when a task included in the step s is allocated to all VMs of a first computation server to which the task m is allocated, the task k may be un-allocatable to the first computation server to which the task m is allocated.

When a task included in the step s is not allocated to at least one of the VMs of the first computation server to which the task m is allocated, the task k may be allocatable to the first computation server to which the task m is allocated.

In operation 506, when the task k is allocatable to the computation server to which the task m is allocated, the control server may allocate the task k to the computation server.

For example, the control server may allocate the task m to at least one VM, to which a task included in the step s is not allocated, in the first computation server to which the task m is allocated.

In operation 507, when the task k is un-allocatable to the computation server to which the task m is allocated, the control server may determine whether the task k is allocatable to a computation server having a shortest transmission latency from the computation server to which the task m is allocated.

The control server may identify a second computation server having a shortest transmission latency from the first computation server to which the task m is allocated, based on transmission latency information between the plurality of computation servers.

For example, when a task included in the step s is allocated to all VMs of the second computation server, the task k may be un-allocatable to the second computation server.

When the task k is un-allocatable to the second computation server, the control server according to some embodiments may proceed to operation 504. That is, the control server may allocate the task k to a computation server having a largest computation processing capacity. The control server may increase the probability that tasks having a dependency with the task k in next steps are allocated to one computation server, by allocating the task k to the computation server having the largest computation processing capacity.

Alternatively, when the task is un-allocatable to the second computation server, the control server according to some embodiments may try to allocate the task k to other computation servers in an order of having a short transmission latency from the first computation server to which the task m is allocated. That is, the control server may identify a third computation server having a shortest transmission latency from the first computation server from among computation servers to which the task k is allocatable, and may allocate the task k to the third computation server.

In operation 508, when the task k is allocatable to a computation server having a shortest transmission latency from the computation server to which the task m is allocated, the control server may allocate the task k to the computation server.

Once the task k is allocated to any one computation server, the control server may perform operations of FIG. 5 to allocate a next task k+1. When all tasks of the step s are allocated to at least one computation server, the control server may perform operations of FIG. 5 to allocate a task included in a next step s+1.

Because the control server according to various embodiments of the disclosure allocates a plurality of tasks to a plurality of computation servers in consideration of a dependency of each task, a computation processing capacity of each of computation servers, and a transmission latency between the computation servers, for each step included in a spread dependency graph, as shown in the method of FIG. 5, a low scheduling complexity may be ensured and a time taken to complete a computing task may be reduced.

Figure 6:
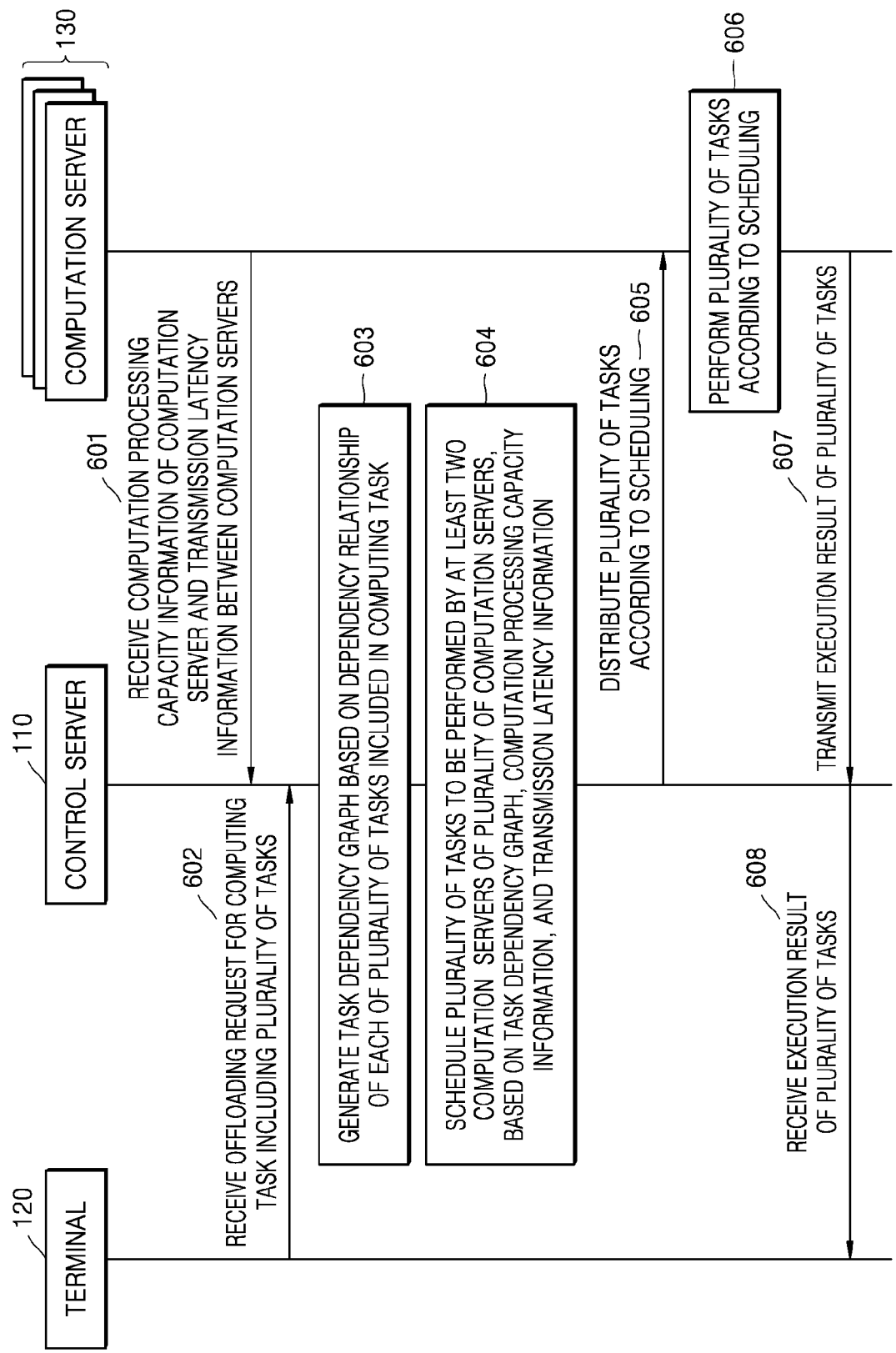
FIG. 6 is a diagram for describing a method by which a control server, a terminal, and computation servers transmit/receive a signal, according to some embodiments.

FIG. 6 is a diagram for describing a method by which the control server 110, the terminal 120, and the computation servers 130 transmit/receive a signal, according to some embodiments.

In FIG. 6, the same description as that made in FIG. 2 will be briefly provided.

In operation 601, the control server 110 may receive computation processing capacity information of a computation server and transmission latency information between computation servers from the plurality of computation servers 130.

In operation 602, the control server 110 may receive an offloading request for a computing task including a plurality of tasks from the terminal 120.

In operation 603, the control server 110 may generate a task dependency graph based on a dependency relationship of each of the plurality of tasks included in the computing task.

In operation 604, the control server 110 may schedule the plurality of tasks to be performed by at least two computation servers of the plurality of computation servers, based on the task dependency graph, the computation processing capacity information, and the transmission latency information.

In operation 605, the control server 110 may distribute the plurality of tasks to the plurality of computation servers 130 according to scheduling.

In operation 606, the computation servers 130 may perform the plurality of tasks according to scheduling.

In operation 607, at least computation server may transmit an execution result of the plurality of tasks to the control server 110 or the terminal 120. At least one server that performs a task of a last step of the entire computing task may transmit a task execution result to the control server 110 or may directly transmit the task execution result to the terminal 120.

In operation 608, when the control server 110 receives the execution result of the plurality of tasks from the at least one computation server, the control server 110 may transmit the received execution result to the terminal 120.

Detailed descriptions of operations 210, 220, 240, and 250 of FIG. 2 may apply to operations 601, 602, 603, 604, and 608 of FIG. 6.

Figure 7:
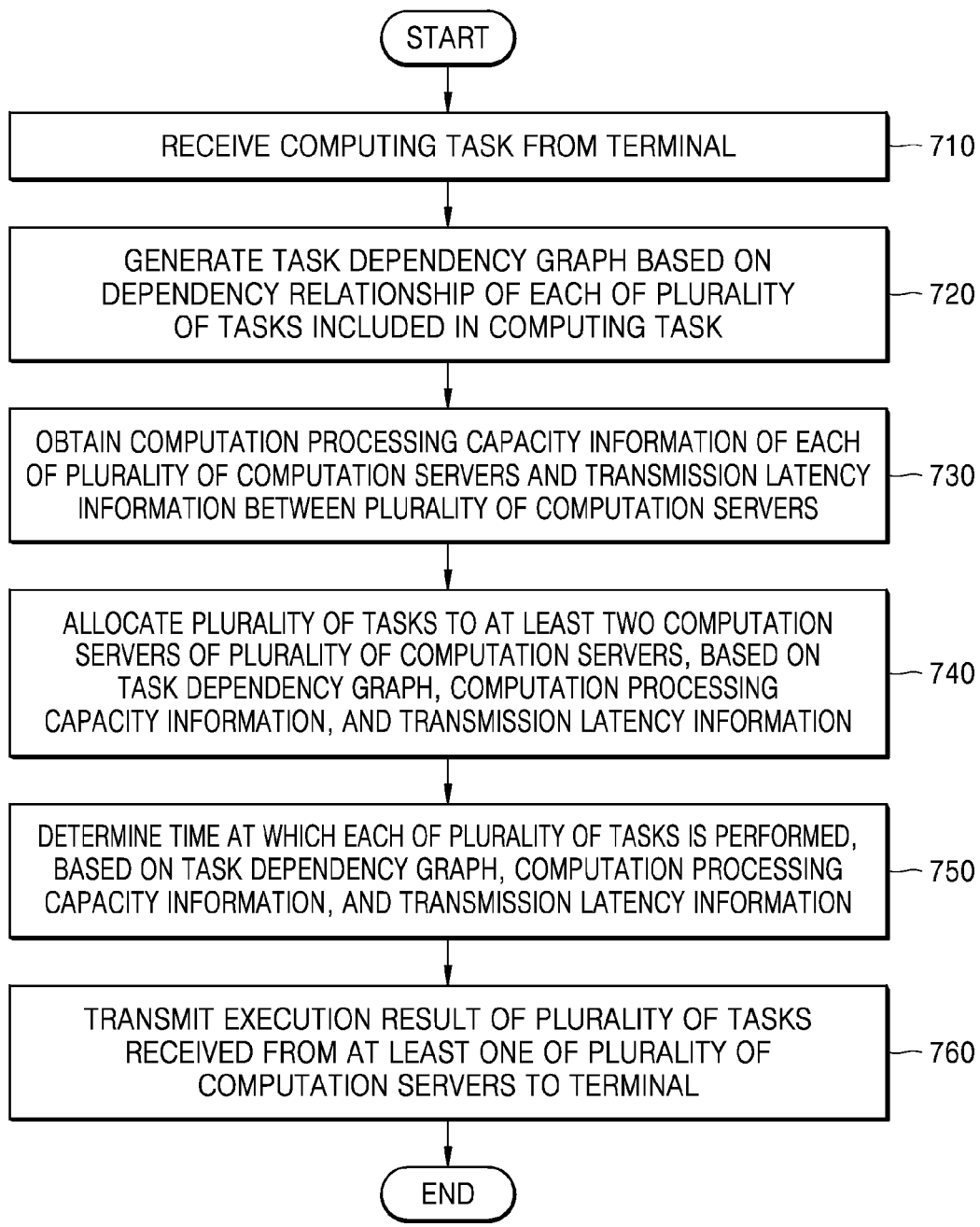
FIG. 7 is a flowchart for describing a method by which a control server allocates a computing task to computation servers and determines a time at which each task is performed, according to some embodiments.

FIG. 7 is a flowchart for describing a method by which a control server allocates a computing task to computation servers and determines a time at which each task is performed, according to some embodiments.

The control server according to some embodiments may allocate a plurality of tasks to a plurality of computation servers, and then may determine a time at which each task is performed. For example, the control server may allocate a plurality of tasks by using the method of FIG. 5, and then may determine a time at which each task is performed.

In FIG. 7, the same description as that made in FIG. 2 will be briefly provided.

In operation 710, the control server may receive a computing task from a terminal.

In operation 720, the control server may generate a task dependency graph based on a dependency relationship of each of a plurality of tasks included in the computing task.

In operation 730, the control server may obtain computation processing capacity information of each of a plurality of computation servers and time latency information between the plurality of computation servers.

In operation 740, the control server may allocate the plurality of tasks to at least two computation servers of the plurality of computation servers, based on the task dependency graph, the computation processing capacity information, and the transmission latency information.

In operation 750, the control server may determine a time at which each of the plurality of tasks is performed, based on the task dependency graph, the computation processing capacity information, and the transmission latency information.

The time at which each task is performed may refer to a point of time when each task is performed based on a point of time (e.g., 0 seconds) when a first task of the entire computing task starts.

The control server according to some embodiments may allocate the plurality of tasks to the plurality of computation servers for each step of a spread task dependency graph in operation 740. When the control server does not determine the time at which each task is performed in the allocating of the plurality of tasks to the plurality of computation servers for each step, or determines the time at which each task is performed based on a time required for each operation, some tasks may be allocated to a same VM during the same time interval due to a transmission latency occurring during signal transmission/reception between the computation servers.

For a first task and a second task allocated to a first VM of a first computation server, when a time at which the first task is performed and a time at which the second task is performed may at least partially overlap each other, the control server may allocate the second task to a second VM of the first computation server and may determine a time at which the second task is performed in the second VM, or may determine a time at which the second task is performed in the first VM so that the second task is performed after the first task is performed.

The control server may determine a time at which each of the plurality of tasks is performed for each step of the task dependency graph. When the control server determines a time at which each task is performed for each step, the control server may determine the time at which each task is performed based on the task dependency graph in which a computational complexity is not adjusted, instead of the spread task dependency graph, so that tasks having a dependency relationship are not allocated to different VMs. That is, the control server may determine the time at which each task is performed based on the task dependency graph 300 of FIG. 3.

The control server may know a time taken to complete the entire computing task by determining the time at which each task is performed, and may perform scheduling so that no tasks are allocated to a same VM during the same time interval.

In operation 740 in which the control server according to some embodiments allocates tasks, the control server may determine the time at which each task is performed so that there are no tasks simultaneously allocated to each VM. For example, the control server may configure the same step start time and end time for all VMs included in the plurality of computation servers, for each step of the spread task dependency graph.

In operation 760, the control server may transmit an execution result of the plurality of tasks received from at least one of the plurality of computation servers to the terminal.

Detailed descriptions of operations 210, 220, 230, 240, and 250 of FIG. 2 may apply to operations 720, 730, 740, and 760 of FIG. 7.

Figure 8:
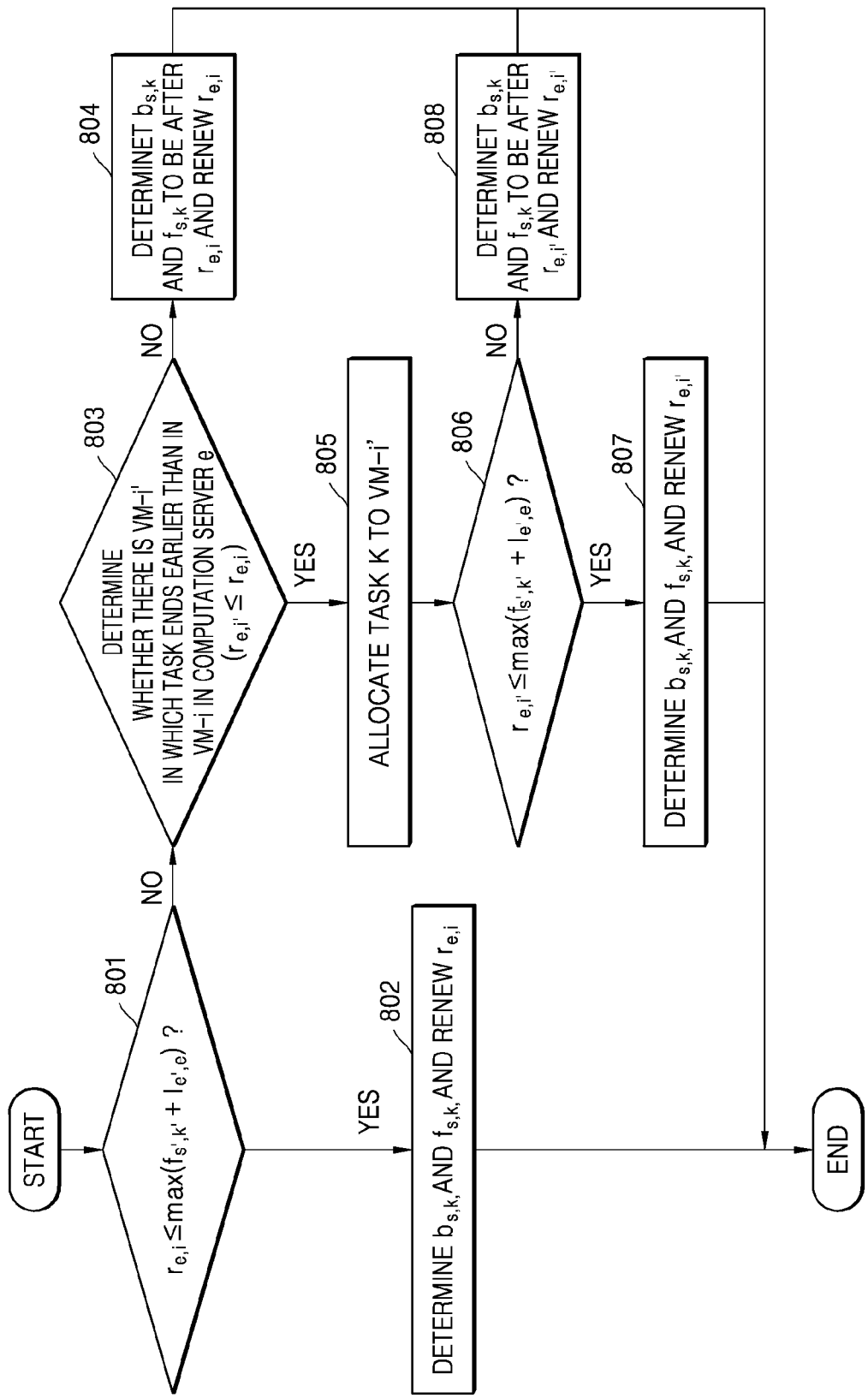
FIG. 8 is a diagram for describing a method by which a control server determines times at which a plurality of tasks are performed, according to some embodiments.

FIG. 8 is a diagram for describing a method by which a control server determines times at which a plurality of tasks are performed, according to some embodiments.

FIG. 8 illustrates an example where the control server determines a time at which each task is performed for each step of a task dependency graph in operation 750 of FIG. 7. That is, FIG. 8 is a diagram for describing a method of determining a time at which a task k of a step s is performed.

The meaning of each variable in FIG. 8 is shown in Table 1.

TABLE 1

| Variable | Definition |
| --- | --- |
| $r_{e,i}$ | Point of time when all tasks allocated to VM-i of computation server e end |
| $r_{e,i'}$ | Point of time when all tasks allocated to VM-i' of computation server e end |
| $b_{s,k}$ | Point of time when computation of task k of step s starts |
| $f_{s,k}$ | Point of time when computation of task k of step s ends |
| $f_{s',k'}$ | Point of time when computation of task k' of step s' having dependency with task k of step s ends |
| e' | Computation server to which task k' of step s' having dependency with task k of step s is allocated |
| $l_{e',e}$ | Transmission latency between computation server e' and computation server e |

Before the method of FIG. 8 is performed, that is, before a point of time when a first task of a first step is performed is determined, the control server may determine a time at which each task is performed based on a time required for each task and transmission latency information in a step of allocating a task to a plurality of computation servers. That is, before the method of FIG. 8 is performed, the control server may determine variables other than $r_{e,i}$ and $r_{e,i'}$ from among all variables in Table 1 based on the time required for each task and the transmission latency information.

In operation 801, the control server may determine whether $r_{e,i} \leq \max(f_{s',k} + l_{e',e})$. $\max(fs',k'+le',e)$ denotes a largest value from among values obtained by adding a point of time when a computation of at least one task of up to a step s-1 having a dependency with the task k of the step s ends to a transmission latency between a computation server e' to which the at least one task is allocated and a computation server to which the task k is allocated.

When the computation server e' to which a task k' of a step s' having a dependency with the task k of the step s is the same as the computation server e to which the task k is allocated, that is, when a transmission latency does not occur, $l_{e',e}0$ is obtained. When the computation servers e' and e are not the same, $l_{e',e} > 0$.

When $r_{e,i} \leq \max(f_{s',k} + l_{e',e})$, because the task k is performed after tasks of up to the step s-1 allocated to a VM-i of the computation server e end, the task k and another task are not simultaneously allocated to the VM-i.

When $r_{e,i} \geq \max(f_{s',k} + l_{e',e})$, because the task k is performed before tasks of up to the step s-1 allocated to the VM-i of the computation server e end, that is, because $b_{s,k}$ determined in the task allocation step is less than $r_{e,i}$, a time at which the task k is performed and a time at which another task is performed in the VM-i at least partially overlap each other.

When the control server determines a time of time when a first task of a first step is performed, that is, when s=1 and k=1, because there is no task allocated to the VM-i yet, $r_{e,i}0$ is obtained. Accordingly, when s=1 and k=1, $r_{e,i} \leq \max(f_{s',k} + l_{e',e})$ is always established.

In operation 802, when $r_{e,i} \leq \max(f_{s',k} + l_{e',e})$, the control server may determine $b_{s,k}$ and $f_{s,k}$ and may renew $r_{e,i}$.

When the control server determines a point of time when a first task of a first step is performed, that is, when s=1 and k=1, $b_{s,k}$, $f_{s,k}$ and $r_{e,i}$ are already determined without consideration of a previous step and do not need to be renewed. When the task is not the first task of the first step, the control server may determine a $\max(f_{s',k} + l_{e',e})$ value as $b_{s,k}$ that is a point of time when the task k starts, and may determine a value obtained by adding a time required for the task k to $b_{s,k}$ as $f_{s,k}$. The control server may renew $r_{e,i}$ by determining the determined $f_{s,k}$ value as $r_{e,i}$.

In operation 803, when $r_{e,i} > \max(f_{s',k} + l_{e',e})$, that is, when a time at which the task k is performed and a time at which another task is performed in the VM-i at least partially overlap each other, the control server may determine whether there is a VM-i' in which a task ends earlier than in the VM-i in the computation server e, that is, whether there is a VM-i' in which $r_{e,i'} \leq r_{e,i}$.

In operation 804, when there is no VM-i' in which a task ends earlier than in the VM-i in the computation server e, the computation server may determine $b_{s,k}$ and $f_{s,k}$ to be after $r_{e,i}$, and may renew $r_{e,i}$.

For example, the control server may determine a $r_{e,i}$ value as $b_{s,k}$, and may determine a value obtained by adding a time required for the task k to $b_{s,k}$ as $f_{s,k}$. The control server may renew $r_{e,i}$ by determining the determined $f_{s,k}$ value as $r_{e,i}$.

That is, when a time at which the task k is performed and a time at which another task is performed in the VM-i allocated in the task allocation step at least partially overlap each other and there is no VM-i' in which a task ends earlier than in the VM-i, the control server may schedule the task k so that the task k is performed after all tasks of the VM-i end.

In operation 805, when there is the VM-i' in which a task ends earlier than the VM-i in the computation server e, the control server may allocate the task k to the VM-i'.

When the control server schedules the task to the VM-i' different from the VM-i allocated in the task allocation step, because only a VM for allocating the task k is adjusted in the computation server e, an additional transmission latency may not occur to perform the task k in the step s.

For example, the control server may schedule the task k to a VM in which a task ends earliest in the computation server e.

In operation 806, the control server may determine whether $r_{e,i} \leq \max(f_{s',k} + l_{e',e})$.

When $r_{e,i} \leq \max(f_{s',k} + l_{e',e})$, because the task k is performed after a task allocated to the VM-i' of the computation server e' ends, the task k and another task are not simultaneously allocated to the VM-i'.

When $r_{e,i} > \max(f_{s',k} + l_{e',e})$, because the task k is performed before a task allocated to the VM-i' of the computation server e ends, that is, because $b_{s,k}$ determined in the task allocation step is less than $r_{e,i'}$, a time at which the task k is performed and a time at which another task is performed in the VM-i' at least partially overlap each other.

In operation 807, when $r_{e,i} \leq \max(f_{s',k} + l_{e',e})$, the control server may determine $b_{s,k}$ and $f_{s,k}$, and may renew $r_{e,i'}$.

For example, the control server may determine a max $(f_{s',k} + l_{e',e})$ value as $b_{s,k}$ that is a point of time when the task k starts, and may determine a value obtained by adding a time required for the task k to $b_{s,k}$ as $f_{s,k}$. The control server may renew $r_{e,i'}$ by determining the determined $f_{s,k}$ value as $r_{e,i'}$.

In operation 808, when $r_{e,i} > \max(f_{s',k} + l_{e',e})$, the control server may determine $b_{s,k}$ and $f_{s,k}$ after rex, and may renew $r_{e,i'}$.

For example, the control server may determine a $r_{e,i'}$ value as $b_{s,k}$, and may determine a value obtained by adding a time required for the task k to $b_{s,k}$ as $f_{s,k}$. The control server may renew $r_{e,i'}$ by determining the determined $f_{s,k}$ value as $r_{e,i'}$.

As described with reference to FIG. 8, for a first task and a second task allocated to a first VM of a first computation server, when a time at which the first task is performed and a time at which the second task is performed at least partially overlap each other, the control server may allocate the second task to a second VM of the first computation server and may determine a time at which the second task is performed in the second VM, or may determine a time at which the second task is performed in the first VM so that the second task is performed after the first task is performed. That is, the control server may perform scheduling so that no tasks are allocated to a same VM during the same time interval.

Also, the control server may know a time taken to complete an entire computing task by determining a time at which each task is performed. For example, $r_{e,i}$ of a task of a last step of the entire computing task may indicate a time taken to complete the entire computing task.

Figure 9:
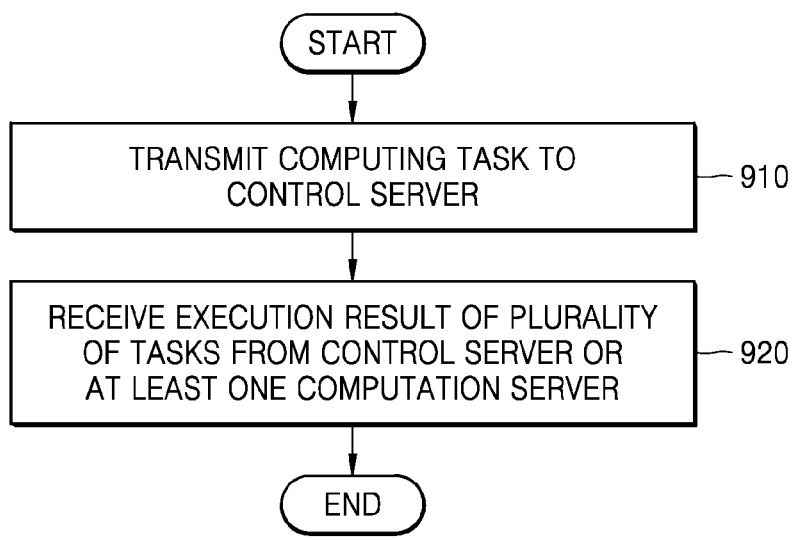
FIG. 9 is a flowchart for describing a method by which a terminal offloads a computing task to a control server, according to some embodiments.

FIG. 9 is a flowchart for describing a method by which a terminal offloads a computing task to a control server, according to some embodiments.

In operation 910, a terminal may transmit a computing task including a plurality of tasks to a control server.

The terminal may transmit an offloading request for the computing task along with the computing task to the control server. A type of the computing task may be determined in various ways. For example, the computing task may be a computation set for performing a service provided by an application installed in the terminal. However, the disclosure is not limited thereto, and the computing task may include any of various types of tasks.

In operation 920, the terminal may receive an execution result of the plurality of tasks from the control server or at least one computation server.

The execution result of the plurality of tasks may be a result obtained when the control server according to some embodiments schedules the plurality of tasks to a plurality of computation servers by using any of the various methods of FIGS. 1 through 8 and the plurality of computation servers perform a computation according to scheduling. For example, the execution result of the plurality of tasks may be a result of performing the plurality of tasks from a plurality of computation servers scheduled based on a task dependency graph generated based on a dependency relationship of each of the plurality of tasks, computation processing capacity information of each of the plurality of computation servers, and transmission latency information between the plurality of computation servers.

Figure 10:
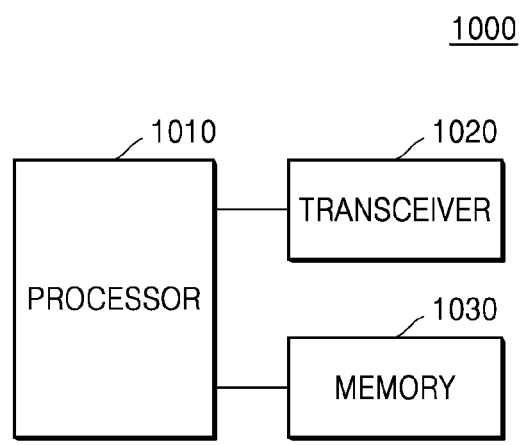
FIG. 10 is a block diagram of a control server according to some embodiments.

FIG. 10 is a block diagram of a control server 1000 according to some embodiments.

Referring to FIG. 10, the control server 1000 may include a transceiver 1020, a processor 1010, and a memory 1030. According to a scheduling method of the control server in the above embodiments, the transceiver 1020, the processor 1010, and the memory 1030 may operate. However, elements of the control server 1000 according to some embodiments are not limited thereto. According to another embodiment, the control server 1000 may include more or fewer elements than those illustrated in FIG. 10. In a specific case, the transceiver 1020, the processor 1010, and the memory 1030 may be implemented as one chip.

The transceiver 1020 may transmit/receive a signal to/from at least one terminal and a plurality of computation servers. The signal may include control information and data. To this end, the transceiver 1020 may include a radio frequency (RF) transmitter that up-converts and amplifies a frequency of a transmitted signal, and an RF receiver that performs low-noise amplification on a received signal and down-converts a frequency. However, this is merely an example, and elements of the transceiver 1020 are not limited to the RF transmitter and the RF receiver.

Also, the transceiver 1020 may receive a signal through a wireless channel and may output a signal to the processor 1010, and may transmit a signal output from the processor 1010 through the wireless channel.

The processor 1010 may control a series of processes so that the control server 1000 operates according to the above embodiments of the disclosure. For example, the processor 1010 may perform a method of transmitting/receiving a signal according to at least one of the above embodiments.

The processor 1010 according to some embodiments may control processes to receive a computing task from a terminal, generate a task dependency graph based on a dependency relationship of each of a plurality of tasks included in the computing task, obtain computation processing capacity information of each of a plurality of computation servers and information of transmission latency between the plurality of computation servers, schedule the plurality of tasks to be performed by at least two computation servers of the plurality of computation servers based on the task dependency graph, the computation processing capacity information, and the information of transmission latency, and transmit an execution result of the plurality of tasks received from at least one of the plurality of computation server to the terminal.

The processor 1010 according to some embodiments may identify a computational complexity of each of the plurality of tasks, may adjust the computational complexity of each of the plurality of tasks by converting at least one of the plurality of tasks into at least one sub-task, and may generate the task dependency graph based on a dependency relationship of each of the plurality of tasks whose computational complexities are adjusted.

When a second task from among the plurality of tasks has a dependency relationship with a first task, the processor 1010 according to some embodiments may allocate the second task to a first computation server to which the first task is allocated, and when the second task is un-allocatable to the first computation server, the processor 1010 may allocate the second task to a second computation server having a shortest transmission latency from the first computation server from among computation servers to which the second task is allocatable based on the information of transmission latency.

When a second task from among the plurality of tasks has a dependency relationship with a first task, the processor 1010 according to some embodiments may allocate the second task to a first computation server to which the first task is allocated; when the second task is un-allocatable to the first computation server, the processor 1010 may allocate the second task to a second computation server having a shortest latency from the first computation server based on the information of transmission latency; and when the second task is un-allocatable to the second computation server, the processor 1010 may allocate the second task to a third computation server having a largest computation processing capacity from among the plurality of computation servers based on the computation processing capacity information.

According to some embodiments, each of the plurality of computation servers may include a plurality of virtual machines (VMs), and the processor 1010 may schedule the plurality of tasks to be performed by the at least two computation servers of the plurality of computation servers by allocating the plurality of tasks to the at least two computation servers and determining a time at which each of the plurality of tasks is to be performed, and for a first task and a second task allocated to a first VM of a first computation server, when a time at which the first task is to be performed and a time at which the second task is to be performed at least partially overlap each other, the processor 1010 may allocate the second task to a second VM of the first computation server and may determine a time at which the second task is to be performed, or may determine a time at which the second task is performed so that the second task is performed after the first task is performed.

The processor 1010 according to some embodiments may schedule the plurality of tasks to be performed by the at least two computation servers of the plurality of computation servers by allocating the plurality of tasks to the at least two computation servers and determining a time at which each of the plurality of tasks is to be performed, may identify a computational complexity of each of the plurality of tasks, may adjust the computational complexity of each of the plurality of tasks by converting at least one of the plurality of tasks into at least one sub-task, may generate a spread task dependency graph according to a dependency relationship of each of the plurality of tasks whose computational complexities are adjusted, may allocate the plurality of tasks to the at least two computation servers based on the spread task dependency graph, and may determine a time at which each of the plurality of tasks is to be performed based on the task dependency graph generated based on the dependency relationship of each of the plurality of tasks whose computational complexities are not adjusted.

The memory 1030 may store control information or data included in a signal obtained by the control server 1000, and may have an area for storing data required for control of the processor 1010 and data generated during control of the processor 1010. For example, the memory 1030 may store pre-set transmission antenna weight information and reception antenna weight information to determine a sum of weights. Also, the memory 1030 may store information on the determined sum of weights.

The memory 1030 may include, for example, a read-only memory (ROM) and/or a random-access memory (RAM) and/or a hard disk and/or a compact disc (CD)-ROM and/or a digital versatile disc (DVD).

Figure 11:
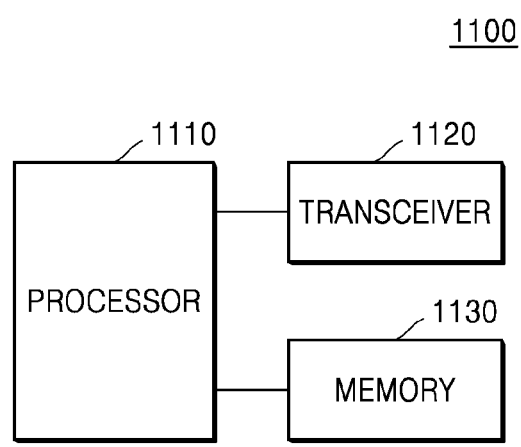
FIG. 11 is a block diagram of a terminal according to some embodiments.

FIG. 11 is a block diagram of a terminal 1100 according to some embodiments.

Referring to FIG. 11, the terminal 1100 may include a transceiver 1120, a processor 1110, and a memory 1130. According to a scheduling method of the terminal in the above embodiments, the transceiver 1120, the processor 1110, and the memory 1130 may operate. However, elements of the terminal 1100 according to some embodiments are not limited thereto. According to another embodiment, the terminal 1100 may include more or fewer elements than those illustrated in FIG. 11. In a specific case, the transceiver 1120, the processor 1110, and the memory 1130 may be implemented as one chip.

The transceiver 1120 may transmit/receive a signal to/from a control server and a plurality of computation servers. The signal may include control information and data. To this end, the transceiver 1120 may include an RF transmitter that up-converts and amplifies a frequency of a transmitted signal, and an RF receiver that performs low-noise amplification on a received signal and down-converts a frequency. However, this is merely an example, and elements of the transceiver 1120 are not limited to the RF transmitter and the RF receiver.

Also, the transceiver 1120 may receive a signal through a wireless channel and may output a signal to the processor 1110, and may transmit a signal output from the processor 1110 through the wireless channel.

The processor 1110 may control a series of processes so that the terminal 1100 operates according to the above embodiments of the disclosure. For example, the processor 1110 may perform a method of transmitting/receiving a signal according to at least one of the above embodiments.

The processor 1110 according to some embodiments may control a computing task to be transmitted to the control server, and an execution result of a plurality of tasks to be received from the control server or at least one computation server. The execution result of the plurality of tasks may be a result of performing the plurality of tasks from at least two computation servers of a plurality of computation servers scheduled based on a task dependency graph generated based on a dependency relationship of each of the plurality of tasks, computation processing capacity information of each of the plurality of computation servers, and information of transmission latency between the plurality of computation servers.

The memory 1130 may store control information or data included in a signal obtained by the terminal 1100, and may have an area for storing data required for control of the processor 1110 and data generated during control of the processor 1110. For example, the memory 1130 may store pre-set transmission antenna weight information and reception antenna weight information to determine a sum of weights. Also, the memory 1130 may store information on the determined sum of weights.

The memory 1130 may include, for example, a ROM and/or a RAM and/or a hard disk and/or a CD-ROM and/or a DVD.

The present disclosure may, however, be embodied in different forms and should not be construed as limited to embodiments of the present disclosure set forth herein; rather, these embodiments of the present disclosure are provided so that this disclosure is thorough and complete.

That is, it will be obvious to one of ordinary skill in the art that various modifications may be made based on the technical spirit of the present disclosure. Also, embodiments of the present disclosure are separated for convenience of explanation and may be combined and implemented when necessary. For example, parts of embodiments of the present disclosure may be combined and implemented by a control server and a terminal. Also, embodiments of the present disclosure may be applied to other systems such as LTE systems, 5G systems, or new radio (NR) systems, and other modifications based on the technical spirit of the embodiments may be made.

A device according to an embodiment may include a processor, a memory for storing and executing program data, a permanent storage such as a disk drive, a communication port for handling communication with external devices, and user interface devices including a touch panel, keys, buttons, etc.

An operating method of a device according to an embodiment may be embodied as program commands executable by various computer means and may be recorded on a computer-readable recording medium. The computer-readable recording medium may include program commands, data files, data structures, and the like separately or in combinations. The program commands recorded on the computer-readable recording medium may be specially designed and configured for the present disclosure or may be well-known to and be usable by one of ordinary skill in the art of computer software. The computer-readable recording medium may be included in a computer program product.

Examples of the computer-readable recording medium include a magnetic medium such as a hard disk, a floppy disk, or a magnetic tape, an optical medium such as a CD-ROM or a DVD, a magneto-optical medium such as a floptical disk, and a hardware device specially configured to store and execute program commands such as a ROM, a RAM, or a flash memory. Examples of the program commands include advanced language codes that may be executed by a computer by using an interpreter or the like as well as machine language codes made by a compiler.

Embodiments of the present disclosure may be described in terms of functional block components and various processing steps. Such functional blocks may be realized by any number of hardware and/or software components configured to perform specific functions. For example, embodiments of the present disclosure may employ various integrated circuit (IC) components, e.g., memory elements, processing elements, logic elements, look-up tables, and the like, which may carry out a variety of functions under the control of one or more microprocessors or other control devices. Similarly, where elements of embodiments of the disclosure may be implemented using software programming or software elements, the embodiments of the disclosure may be implemented with any programming or scripting language such as C, C++, Java, assembler language, or the like, with the various algorithms being implemented with any combination of data structures, processes, routines, or other programming elements. Functional aspects may be implemented in algorithms that are executed on one or more processors. Furthermore, embodiments of the present disclosure could employ any number of techniques according to the related art for electronics configuration, signal processing and/or control, data processing, and the like

The invention claimed is:

1. A control server for scheduling a computing task comprising a plurality of tasks to be performed by computation servers, the control server comprising:
 a transceiver;
 a memory; and
 at least one processor configured to:
  receive the computing task from a terminal,
  generate a task dependency graph based on a dependency relationship of each of the plurality of tasks included in the computing task,
  obtain computation processing capacity information of each of a plurality of computation servers and information of transmission latency between the plurality of computation servers,
  schedule the plurality of tasks to be performed by at least two computation servers of the plurality of computation servers, based on the task dependency graph, the computation processing capacity information, and the information of transmission latency,
  transmit, to the terminal, an execution result of the plurality of tasks received from at least one of the plurality of computation servers,
  schedule the plurality of tasks to be performed by the at least two computation servers of the plurality of computation servers by allocating the plurality of tasks to the at least two computation servers and determining a time at which each of the plurality of tasks is to performed,
  identify a computational complexity of each of the plurality of tasks, adjust the computational complexity of each of the plurality of tasks by converting at least one of the plurality of tasks into at least one sub-task, generate a spread task dependency graph according to a dependency relationship of each of the plurality of tasks whose computational complexities are adjusted, allocate the plurality of tasks to the at least two computation servers based on the spread task dependency graph, and
  determine a time at which each of the plurality of tasks is to be performed based on the task dependency graph generated based on the dependency relationship of each of the plurality of tasks whose computational complexities are not adjusted.

2. The control server of claim 1, wherein the at least one processor is further configured to
 identify a computational complexity of each of the plurality of tasks,
 adjust the computational complexity of each of the plurality of tasks, by converting at least one of the plurality of tasks into at least one sub-task, and
 generate the task dependency graph based on a dependency relationship of each of the plurality of tasks whose computational complexities are adjusted.

3. The control server of claim 1, wherein the at least one processor is further configured to:
 in case that a second task of the plurality of tasks has a dependency relationship with a first task,
 allocate the second task to a first computation server to which the first task is allocated, and
 in case that the second task is un-allocatable to the first computation server, allocate the second task to a second computation server having a shortest transmission latency from the first computation server from among computation servers to which the second task is allocatable based on the information of transmission latency.

4. The control server of claim 1, wherein the at least one processor is further configured to:
 in case that a second task of the plurality of tasks has a dependency relationship with a first task,
 allocate the second task to a first computation server to which the first task is allocated,
 in case that the second task is un-allocatable to the first computation server, allocate the second task to a second computation server having a shortest transmission latency from the first computation server based on the information of transmission latency information, and
 in case that the second task is un-allocatable to the second computation server, allocate the second task to a third computation server having a largest computation processing capacity from among the plurality of computation servers based on the computation processing capacity information.

5. The control server of claim 1, wherein
 each of the plurality of computation servers comprises a plurality of virtual machines (VMs), and
 wherein the at least one processor is further configured to:
 schedule the plurality of tasks to be performed by the at least two computation servers of the plurality of computation servers by allocating the plurality of tasks to the at least two computation servers and determining a time at which each of the plurality of tasks is to be performed, and
 for a first task and a second task allocated to a first VM of a first computation server, in case that a time at which the first task is to be performed and a time at which the second task is to be performed at least partially overlap each other, allocate the second task to a second VM of the first computation server and determine a time at which the second task is to be performed, or determine a time at which the second task is to be performed so that the second task is performed after the first task is performed.

6. A method, performed by a control server, of scheduling a computing task comprising a plurality of tasks to be performed by computation servers, the method comprising:
 receiving the computing task from a terminal;
 generating a task dependency graph based on a dependency relationship of each of the plurality of tasks included in the computing task;
 obtaining computing processing capacity information of each of a plurality of computation servers and information of transmission latency between the plurality of computation servers;
 scheduling the plurality of tasks to be performed by at least two computation servers of the plurality of computation servers, based on the task dependency graph, the computing processing capacity information, and the information of transmission latency; and
 transmitting an execution result of the plurality of tasks received from at least one of the plurality of computation servers to the terminal, wherein the scheduling comprises:
allocating the plurality of tasks to the at least two computation servers; and
determining a time at which each of the plurality of tasks is to be performed,
wherein the allocating of the plurality of tasks to the at least two computation servers comprises:
identifying a computational complexity of each of the plurality of tasks;
adjusting the computational complexity of each of the plurality of tasks, by converting at least one of the plurality of tasks into at least one sub-task;
generating a spread task dependency graph, according to a dependency relationship of each of the plurality of tasks whose computational complexities are adjusted; and
allocating the plurality of tasks to the at least two computation servers based on the spread task dependency graph,
wherein the determining of the time at which each of the plurality of tasks is to be performed comprises
determining a time at which each of the plurality of tasks is to be performed based on the task dependency graph generated based on the dependency relationship of each of the plurality of tasks whose computational complexities are not adjusted.

7. The method of claim 6, wherein
the generating of the task dependency graph comprises:
identifying a computational complexity of each of the plurality of tasks;
adjusting the computational complexity of each of the plurality of tasks, by converting at least one of the plurality of tasks into at least one sub-task; and
generating the task dependency graph based on a dependency relationship of each of the plurality of tasks whose computational complexities are adjusted.

8. The method of claim 6, wherein
the scheduling comprises, in case that a second task of the plurality of tasks has a dependency relationship with a first task,
allocating the second task to a first computation server to which the first task is allocated, and
in case that the second task is un-allocatable to the first computation server, allocating the second task to a second computation server having a shortest transmission latency from the first computation server from among computation servers to which the second task is allocatable based on the information of transmission latency.

9. The method of claim 6, wherein
the scheduling comprises, in case that a second task of the plurality of tasks has a dependency relationship with a first task,
allocating the second task to a first computation server to which the first task is allocated,
in case that the second task is un-allocatable to the first computation server, allocating the second task to a second computation server having a shortest transmission latency from the first computation server based on the information of transmission latency, and
that the second task is un-allocatable to the second computation server, allocating the second task to a third computation server having a largest computation processing capacity from among the plurality of computation servers based on the computing processing capacity information.

10. The method of claim 6, wherein
each of the plurality of computation servers comprises a plurality of virtual machines (VMs),
wherein the determining of the time at which each of the plurality of tasks is to be performed comprises,
for a first task and a second task allocated to a first VM of a first computation server, in case that a time at which the first task is to be performed and a time at which the second task is to be performed at least partially overlap each other, allocating the second task to a second VM of the first computation server and determining a time at which the second task is to be performed, or determining a time at which the second task is to be performed so that the second task is performed after the first task is performed.

11. A computer program product comprising a recording medium storing a program for executing the method of claim 6.

* * * * *